(12) United States Patent
Zimmermann et al.

(10) Patent No.: US 7,926,650 B2
(45) Date of Patent: Apr. 19, 2011

(54) INTERFACE FOR FLEXIBLE FLUID ENCLOSURES

(75) Inventors: Joerg Zimmermann, Vancouver (CA); Gerard F McLean, West Vancouver (CA); Tristan Sloan, Vancouver (CA); Jean-Louis Iaconis, Burnaby (CA)

(73) Assignee: Angstrom Power Incorporated, North Vancouver (CA)

( * ) Notice: Subject to any disclaimer, the term of this patent is extended or adjusted under 35 U.S.C. 154(b) by 293 days.

(21) Appl. No.: 12/052,829

(22) Filed: Mar. 21, 2008

(65) Prior Publication Data

US 2008/0230401 A1 Sep. 25, 2008

Related U.S. Application Data

(60) Provisional application No. 60/919,471, filed on Mar. 21, 2007.

(51) Int. Cl.
*F17C 1/02* (2006.01)
*F17C 11/00* (2006.01)

(52) U.S. Cl. .......................... 206/0.7; 222/93

(58) Field of Classification Search .................... 96/108; 206/0.6, 0.7; 423/248, 648.1, 658.2; 420/900; 502/526; 222/2, 92, 93, 96, 106, 511; 220/89.1
See application file for complete search history.

(56) References Cited

U.S. PATENT DOCUMENTS

| | | | | |
|---|---|---|---|---|
| 4,320,789 A * | 3/1982 | Martin et al. | ................. | 222/107 |
| 4,396,114 A * | 8/1983 | Golben et al. | ................. | 206/0.7 |
| 4,583,638 A * | 4/1986 | Bernauer et al. | ............... | 206/0.7 |
| 4,667,815 A * | 5/1987 | Halene | ............................. | 206/0.7 |
| 5,685,456 A * | 11/1997 | Goldstein | ........................ | 222/95 |
| 6,432,379 B1 * | 8/2002 | Heung | ........................ | 423/648.1 |
| 6,518,675 B2 | 2/2003 | Kim et al. | | |
| 6,626,323 B2 * | 9/2003 | Stetson et al. | ................. | 220/577 |
| 6,651,659 B2 * | 11/2003 | Izuchukwu | .............. | 128/205.15 |
| 7,169,214 B2 * | 1/2007 | Kubo et al. | ..................... | 96/108 |
| 7,651,554 B2 * | 1/2010 | Tan et al. | ......................... | 96/108 |
| 2005/0188847 A1 * | 9/2005 | Fujita et al. | ..................... | 96/126 |
| 2006/0021882 A1 * | 2/2006 | Kaye et al. | ..................... | 206/0.6 |
| 2006/0237688 A1 * | 10/2006 | Zimmermann | ............... | 252/184 |
| 2007/0077470 A1 * | 4/2007 | Adams et al. | ................... | 429/25 |
| 2007/0295617 A1 * | 12/2007 | Zimmermann | ................... | 206/7 |
| 2010/0035102 A1 * | 2/2010 | Zimmermann et al. | ........ | 429/13 |

* cited by examiner

*Primary Examiner* — Frank M Lawrence
(74) *Attorney, Agent, or Firm* — Schwegman Lundberg & Woessner, P.A.

(57) ABSTRACT

Embodiments of the present invention relate to a flexible fluid enclosure interface system comprising a flexible fluid enclosure, one or more components and one or more strain absorbing interfaces in contact with the flexible fluid enclosure and the one or more components.

24 Claims, 3 Drawing Sheets

INTERFACE FOR FLEXIBLE FLUID ENCLOSURES

PRIORITY OF INVENTION

This nonprovisional application claims the benefit of priority under 35 U.S.C. §119(e) to U.S. Patent Application Ser. No. 60/919,471, filed Mar. 21, 2007, which is herein incorporated by reference.

BACKGROUND

Hydrogen storage systems utilizing flexible enclosure walls offer important advantages over conventional hydrogen storage systems including reduced weight, improved density of storage material and adaptability to small prismatic packages, all without sacrificing storage capacity.

However, such enclosure systems pose challenges for interface design since their principal dimensions change as a function of the state of charge of the storage material, such as storing hydrogen. The variable geometry of the flexible enclosure creates difficulty in interfacing with fluidic or support connections. The position of any openings or apertures which allow a fluid, such as hydrogen, to flow into or out of the enclosure may move as the state of charge varies. Also, the point of attachment of any interface fitting or connection to the enclosure can be subject to very high local strains as a rigid device is attached to a relatively flexible substrate.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
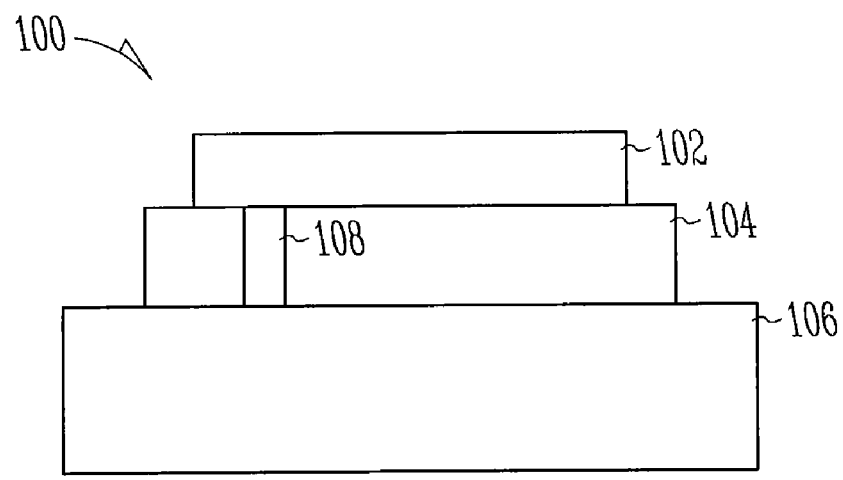
FIG. 1 illustrates a cross-sectional view of a flexible fluid enclosure interface system, according to some embodiments.

Embodiments of the present invention relate to a fluid enclosure interface system including a flexible fluid enclosure, one or more components and one or more strain absorbing interfaces in contact with the flexible fluid enclosure and the one or more components. Embodiments also relate to an enclosure interface system including a straining fluid enclosure, one or more components and one or more interfaces. The one or more interfaces may be in contact with the fluid enclosure and the one or more components and adapted to relieve a strain between the one or more components and the fluid enclosure. The one or more interfaces may also provide a fluidic coupling between the enclosure and the one or more components.

Embodiments of the present invention also relate to a method of making a fluid enclosure interface system including forming a strain absorbing interface and contacting the strain absorbing interface with a flexible fluid enclosure and a component. Embodiments also relate to a method including the straining of a flexible enclosure and relieving a strain at an interface of the enclosure and one or more components in contact with the enclosure.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a strain absorbing interface for contacting a rigid or semi-rigid component and a flexible fluid enclosure. The interface absorbs any strain or force exerted due to dimensional changes in the fluid enclosure as it occludes or desorbs a fluid. Rigid components, such as mounts or fluidic devices for fuel cell communication, can be coupled to the fluid enclosure through the interface and not risk sheering due to mechanical stress. Previously, rigid connections would have to be contacted at a single point, allowing the enclosure to expand in all other directions. This limited the geometry of the enclosure and usefulness in many applications. The rigid connection would most likely contact the enclosure at a less than ideal location and would have to mechanically support the attachment. Any load placed on the enclosure would be transferred to the connection and possibly cause failure. The flexible or strain absorbing interface of the present invention allows for more component configurations and applications for use with a flexible fluid enclosure. The flexible interface absorbs strain and supports the connection between component and enclosure.

DEFINITIONS

As used herein, "electrochemical layer" refers to a sheet including one or more active functional members of an electrochemical cell. For example, an electrochemical layer may include a fuel cell layer. As used herein, "active functional members" refers to components of an electrochemical cell that function to convert chemical energy to electrical energy or convert electrical energy to chemical energy. Active functional members exhibit ion-conductivity, electrical conductivity, or both.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. Further examples of fuel cells include proton exchange membrane fuel cells, direct methanol fuel cells, alkaline fuel cells, phosphoric acid fuel cells, molten carbonate fuel cells or solid oxide fuel cells.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, trisilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, and formic acid.

As used herein, "fluid enclosure" may refer to a device for storing a fluid. The fluid enclosure may store a fluid physically or chemically. For example, the fluid enclosure may chemically store a fluid in active material particles. A fluid enclosure may also refer to a fluid enclosure including active material particles and an outer enclosure wall, conformably coupled to the fluid storage component and may also include structural fillers. Examples of such a fluid enclosure are found in commonly-owned U.S. patent application Ser. No. 11/473,591, filed Jun. 23, 2006, whose disclosure is incorporated by reference herein in its entirety.

As used herein, "flexible fluid enclosure" or "flexible portion of a fluid enclosure" may refer to a fluid enclosure including a structural filler and an outer enclosure wall, conformably coupled to the structural filler. The fluid enclosure may be flexible in one or more dimensions. Flexible may describe the expansion or contraction of the fluid enclosure in one or more dimensions. The flexibility of the fluid enclosure may exert a strain on any interface or rigid or semi-rigid components in contact with the enclosure, for example.

As used herein, "conformably coupled" refers to forming a bond that is substantially uniform between two components and are attached in such as way as to chemically or physically bind in a corresponding shape or form. A structural filler may be conformably coupled to an outer enclosure wall, for example, in which the outer enclosure wall chemically or physically binds to the structural filler and takes its shape.

As used herein, "outer enclosure wall" refers to the outermost layer within a fluid enclosure that serves to at least partially slow the diffusion of a fluid from the fluid enclosure. The outer enclosure wall may include multiple layers of the same or differing materials. The outer enclosure wall may include a polymer or a metal, for example.

As used herein, "structural filler" refers to a material with a sufficient tensile strength to withstand the internal pressure of a fluid enclosure, when pressurized with a fluid. Structural fillers may be solid. Structural fillers may include metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

As used herein, "fluid storage material" refers to a material that may be in physical or chemical contact with a fluid, usually for the purpose of assisting the storage of the fluid. Hydrogen may be chemically bound with a metal alloy to provide a metal hydride, an example of a fluid storage material.

As used herein, "active material particles" refer to material particles capable of storing hydrogen or other fluids or to material particles that may occlude and desorb hydrogen or another fluid. Active material particles may include fluid-storing materials that occlude fluid, such as hydrogen, by chemisorption, physisorption or a combination thereof. Some hydrogen-storing materials desorb hydrogen in response to stimuli, such as change in temperature, change in heat or a change in pressure. Examples of hydrogen-storing materials that release hydrogen in response to stimuli, include metal hydrides, chemical hydrides, suitable micro-ceramics, nano-ceramics, boron nitride nanotubes, metal organic frameworks, palladium-containing materials, zeolites, silicas, aluminas, graphite, and carbon-based reversible fluid-storing materials such as suitable carbon nanotubes, carbon fibers, carbon aerogels, and activated carbon, nano-structured carbons or any combination thereof. The particles may also include a metal, a metal alloy, a metal compound capable of forming a metal hydride when in contact with hydrogen, alloys thereof or combinations thereof. The active material particles may include magnesium, lithium, aluminum, calcium, boron, carbon, silicon, transition metals, lanthanides, intermetallic compounds, solid solutions thereof, or combinations thereof.

As used herein, "occlude" or "occluding" or "occlusion" refers to absorbing or adsorbing and retaining a substance, such as a fluid. Hydrogen may be a fluid occluded, for example. The fluid may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen or other fluid may be bound physically or chemically, for example.

As used herein, "contacting" refers to physically, chemically, electrically touching or within sufficiently close proximity. A fluid may contact an enclosure, in which the fluid is physically forced inside the enclosure, for example.

Referring to FIG. 1, a cross-sectional view 100 of a flexible fluid enclosure interface system is shown, according to some embodiments. The system includes a flexible fluid enclosure 106 in contact with a strain absorbing interface 104 on a first side. On a second side, the interface 104 may be in contact with a component 102. An optional fluidic connection 108 may be positioned in the interface 104, connecting the enclosure 106 and component 102.

The fluid enclosure 106 may be an enclosure formed by conformably coupling an outer wall to a composite hydrogen storage material, for example. Conformably coupled refers to forming a bond that is substantially uniform between two components and are attached in such as way as to chemically or physically bind in a corresponding shape or form. A structural filler or composite hydrogen storage material may be conformably coupled to an outer enclosure wall, for example, in which the outer enclosure wall chemically or physically binds to the structural filler or composite hydrogen storage material and takes its shape. The outer enclosure wall is the outermost layer within a fluid enclosure that serves to at least partially slow the diffusion of a fluid from the enclosure. The outer enclosure wall may include multiple layers of the same or differing materials. The outer enclosure wall may include a polymer or a metal, for example. The fluid may be hydrogen, for example.

The strain absorbing interface 104 may be manufactured of any suitable material that allows it to be flexible, absorb strain and bond to the enclosure 106 and component 102. The material chosen should provide a suitable bond, physical or chemical, between the component 102 and enclosure 106 and also allow for the differential in strain between the strain of the enclosure wall and the rigidity of the component 102, so that the sheer stress on any bonds does not exceed the strength of such bonds. The interface 104 may be manufactured of an elastomeric material or silicon material, for example. Elastomeric materials may include thermoplastic elastomers, polyurethane thermoplastic elastomers, polyamides, polyimides, melt processable rubber, thermoplastic vulcanizate, synthetic rubber and natural rubber, for example. Examples of synthetic rubber materials may include nitrile rubber, fluoroelastomers such as Viton® rubber (available from E.I. DuPont de Nemours, a Delaware corporation), ethylene propylene diene monomer rubber (EPDM rubber), styrene butadiene rubber (SBR), and Fluorocarbon rubber (FKM).

Figure 2:
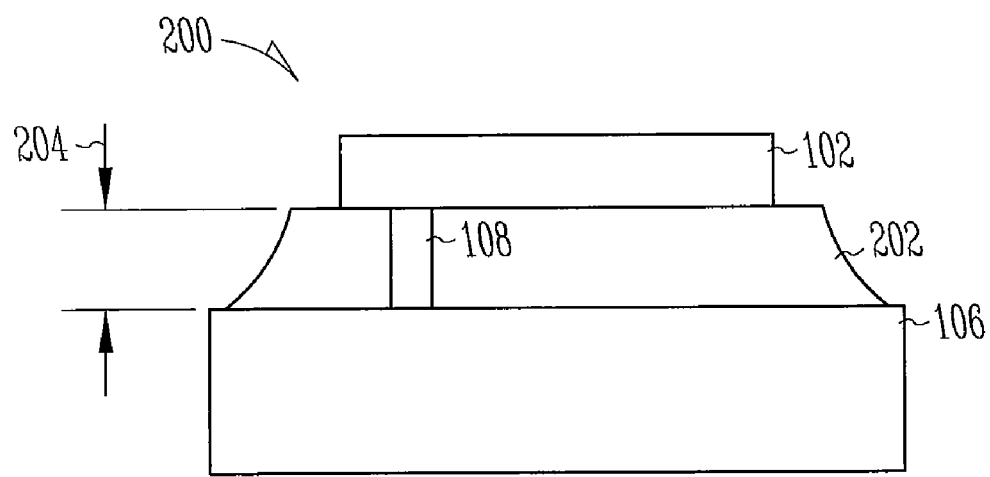
FIG. 2 illustrates a cross-sectional view of a flexible fluid enclosure interface system in a charged state, according to some embodiments.

As the fluid enclosure 106 is filled with fluid, or charged, the dimensions of the enclosure 106 increase (see FIG. 2). The strain absorbing interface 106 may deform or change in dimension, such as in thickness 204. The strained interface 202 then maintains a consistent, less stressful contact between the enclosure 106 and component 102. The component 102 would then undergo little to no strain, as the interface 202 absorbs strain caused by the enclosure 106 deformations or contractions/expansions. The interface 202 may absorb all or at least part of the strain caused by changes in dimension of enclosure 106.

The enclosure 106 may include fuel cartridges, such as replaceable fuel cartridges. The cartridges may include dispenser cartridges, disposable fuel ampoules, refillable fuel tanks or fuel cell cartridges, for example. The fuel cartridge may include a flexible liner that is connectable to a fuel cell or fuel cell layer. The fuel cartridge may also include a connecting valve for connecting the cartridge to a fuel cell, fuel cell layer or refilling device.

The component 102 may be any fitting, mount, electrochemical cell layer, fuel cell layer, fluidic control layer, connector, valve, regulator, pressure relief device, planar microfluidic device, a fluid manifold, a plate, any device that might control the flow of hydrogen into or out of the enclosure or combinations thereof, for example. Multiple interfaces 104 and multiple components 102 may be utilized in conjunction with one or more fluid enclosures 106. The components 102 may be surface-mounted to the one or more strain absorbing interfaces.

Examples of such components 102 are discussed in Mclean et al., U.S. patent application Ser. No. 12/053,374, entitled "FLUIDIC CONTROL SYSTEM AND METHOD OF MANUFACTURE," and Zimmermann et al., U.S. patent application Ser. No. 12/053,408, entitled "FLUIDIC DISTRIBUTION SYSTEM AND RELATED METHODS", and Schrooten et al., U.S. patent application Ser. No. 12/053,366, entitled "FLUID MANIFOLD AND METHOD THEREFOR", filed even date herewith, the disclosures of which are incorporated herein by reference in their entirety. Further examples may be found in commonly owned U.S. patent application Ser. No. 11/621,542, filed Jan. 9, 2007, the disclosure of which is incorporated herein.

Figure 3:
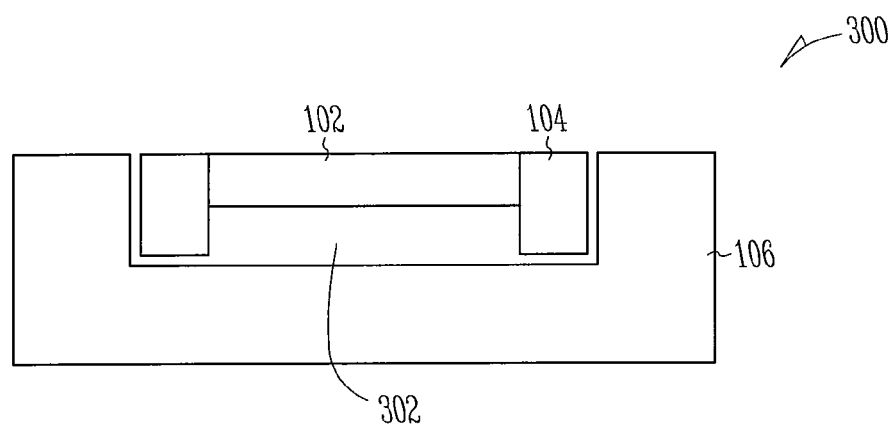
FIG. 3 illustrates a cross-sectional view of a flexible fluid enclosure interface system utilizing a cavity, according to some embodiments.

Referring to FIG. 3, a cross-sectional view 300 of a flexible fluid enclosure interface system utilizing a cavity is shown, according to some embodiments. The system is shown in an uncharged state and includes a component 102 in contact an interface 104 and positioned in a cavity 302 of a fluid enclosure 106. The interface 104 may partially or fully surround the component 102 within the cavity 302 or be positioned underneath the component 102, for example. The cavity 302 may allow for the component 102 and interface 104 to remain within the general shape of the enclosure 106 and not provide any external features. Alternatively, the interface 104 may contact an external feature of the enclosure 106 and support one or more components 102.

The cavity 302 may be of any geometry suitable to recess all or a portion of one or more components 102. The cavity 302 may be irregularly shaped or configured to accept the dimensions of all or part of one or more components 102 or interface 104.

Figure 4:
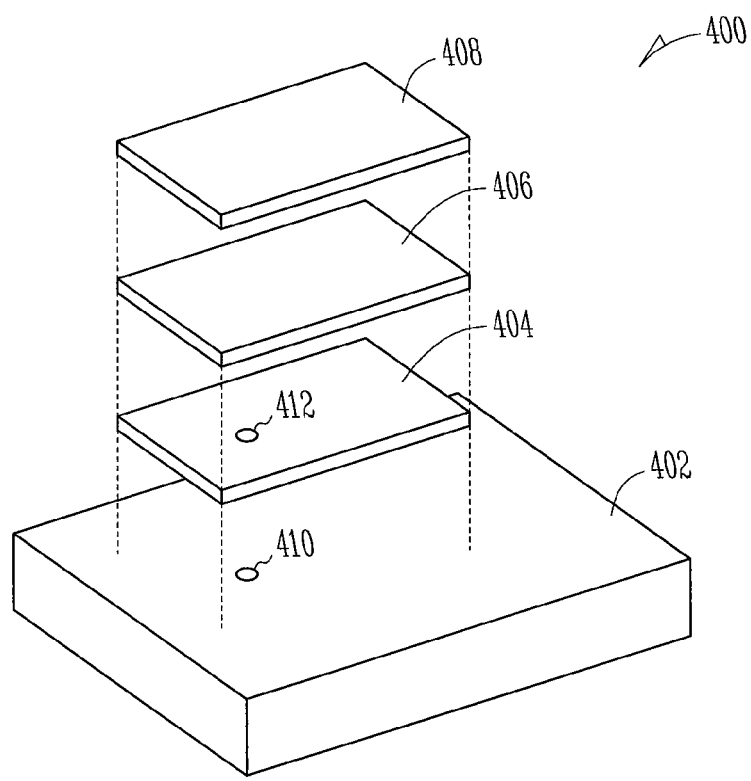
FIG. 4 illustrates a perspective view of a flexible fluid enclosure interface system, according to some embodiments.

Referring to FIG. 4, a perspective view 400 of a flexible fluid enclosure interface system is shown, according to some embodiments. A fluid enclosure 402 supports an interface 404. Components 406, 408 of a planar device may be positioned on the opposite side of the interface 404 as the enclosure 402. The components 406, 408 may be part of a planar fuel regulator, for example. An aperture 412 in the interface 404 may line up with an aperture 410 in the enclosure 402. This would allow for fluidic communication of hydrogen from the enclosure 402 through the interface 404 and to the planar components 406, 408.

The one or more interfaces 404 may be adapted to provide a fluidic coupling between the enclosure 402 and one or more components 406, 408. The interface 404 would relieve strain, but also facilitate the function of the system by providing a fluid path or channel, without unnecessarily adding volume to the system and decreasing its energy density. The fluid enclosure 402 may strain as a result of a fluid, such as hydrogen, occluding or desorbing, which may cause an expansion or contraction of the enclosure and result in strain on the interface 404. The interface 404 may also absorb stain caused by the presence of or movement of the fluid through the interface 404.

The fluid enclosure 402 may be coupled to an external device, such that the fluid may be released to the external device for its use or to power the device, for example. Examples of an external device may be a fuel cell, a fuel cell layer or system, a heat pump, an electrolyser, or an electrochemical cell, cell layer, or system. The external device may be coupled to the one or more components 406, 408, interface or the external device may be one of the components 406, 408, for example.

Figure 5:
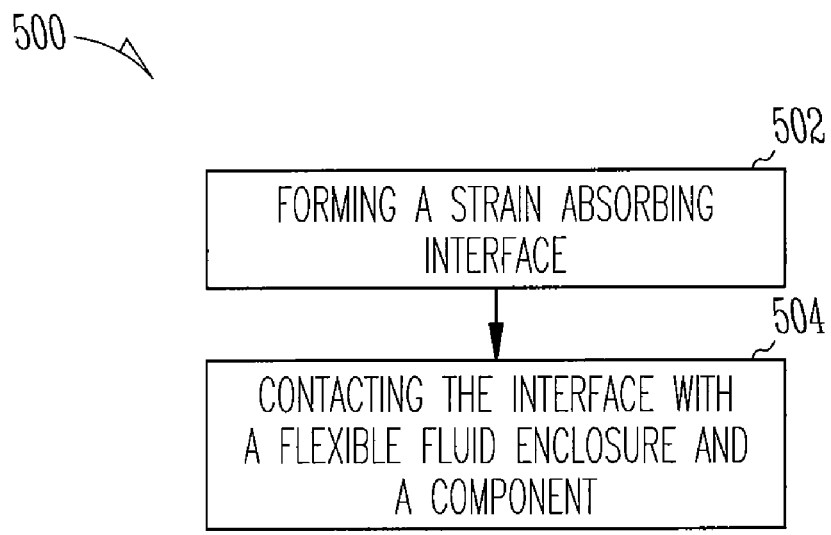
FIG. 5 illustrates a block flow diagram of a method of making a flexible fluid enclosure interface system, according to some embodiments.

Referring to FIG. 5, a block flow diagram 500 of a method of making a flexible fluid enclosure interface system is shown, according to some embodiments. A strain absorbing interface may be formed 502. The interface may then be contacted 504 with a flexible fluid enclosure and a component, on a first and second side, respectively. Contacting may include adhering, such as by applying an adhesive. Adhering may include the use of pressure, heat or both. Examples of adhesives used to contact the interface and enclosure may include flexible thermosetting adhesives, such as epoxy, polyamide and polyurethane. Further examples may include epoxy, cyanoacrylate, and RTV or other silicone adhesives. Adhesives may be flexible, non-flexible or some combination thereof. In embodiments where the enclosure wall is constructed out of natural or synthetic rubber, the interface may be vulcanized to the enclosure wall, or be a protruding feature of the wall. Contacting 504 may include contacting the fluid enclosure on a first side of the interface and contacting the component on a second side of the interface.

Figure 6:
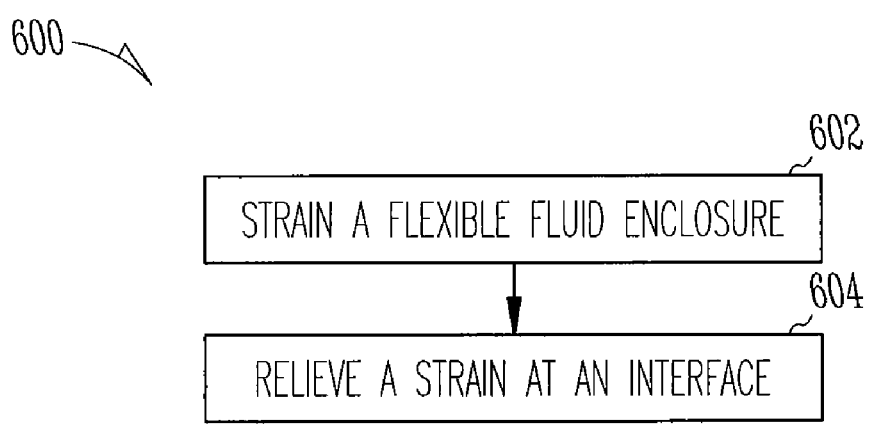
FIG. 6 illustrates a block flow diagram of a method of operating a flexible fluid enclosure interface system, according to some embodiments.

Referring to FIG. 6, a block flow diagram 600 of a method of operating a flexible fluid enclosure interface system is shown, according to some embodiments. A flexible fluid enclosure may be strained 602. A strain may be relieved 604 at an interface of the flexible fluid enclosure and one or more components in contact with the enclosure. Straining 602 may include contacting a flexible fluid enclosure with a fluid, sufficient to increase one or more of the dimensions of the enclosure. Relieving 604 may include absorbing. Straining 602 may be in response to a change in temperature, a change in pressure, a contacting of hydrogen or a combination thereof, with regard to the flexible fluid enclosure.

What is claimed is:

1. A fluid enclosure interface system, comprising:
a flexible fluid enclosure, including
   a structural filler, including
      a material capable of occluding and desorbing a fluid;
      a binder; and
   an outer enclosure wall, conformably coupled to the structural filler;
   wherein the structural filler supports stress applied by an internal fluid pressure;
one or more components, including
   a device that can control the flow of a fluid into or out of the enclosure; and
one or more strain absorbing interfaces, in contact with the flexible fluid enclosure and the one or more components;
wherein the one or more strain absorbing interfaces is flexible, allowing for a differential in strain between the flexible fluid enclosure and the one or more components.

2. The fluid enclosure of claim 1, wherein the one or more components are rigid, semi-rigid or less flexible than the flexible fluid enclosure.

3. The fluid enclosure interface system of claim 1, wherein the one or more components are surface-mounted to the one or more strain absorbing interfaces.

4. The fluid enclosure interface system of claim 1, wherein the flexible fluid enclosure comprises a cavity.

5. The fluid enclosure interface system of claim 1, wherein the one or more components comprise a fitting, mount, connector, valve, regulator, pressure relief device, planar microfluidic device, fluid manifold, a plate or combinations thereof.

6. The fluid enclosure interface system of claim 1, wherein the one or more strain absorbing interfaces comprise thermoplastic elastomers, polyurethane thermoplastic elastomers, polyamides, melt processable rubbers, thermoplastic vulcanizates, polyimides, synthetic rubbers or natural rubbers.

7. A fluid enclosure interface system, comprising:
a straining fluid enclosure, including
   a structural filler, including
      a material capable of occluding and desorbing a fluid;
      a binder; and
   an outer enclosure wall, conformably coupled to the structural filler;
   wherein the structural filler supports stress applied by an internal fluid pressure;
one or more components, including
   a device that can control the flow of a fluid into or out of the enclosure; and
one or more interfaces, in contact with the straining fluid enclosure and the one or more components and adapted to relieve a strain between the one or more components and the straining fluid enclosure;
wherein the one or more interfaces provide a fluidic coupling between the straining fluid enclosure and one or more components.

8. The fluid enclosure interface system of claim 7, wherein the strain is caused by expanding or contracting of the straining fluid enclosure.

9. The fluid enclosure interface system of claim 7, wherein the straining fluid enclosure expands or contracts as a result of desorbing or occluding a fluid within the fluid enclosure.

10. The fluid enclosure interface system of claim 7, wherein the straining fluid enclosure includes a composite hydrogen storage material.

11. The fluid enclosure interface system of claim 7, wherein the one or more components include an electrochemical cell, fuel cell, a heat pump, an electrolyser or combinations thereof.

12. The fluid enclosure interface system of claim 7, wherein the strain is caused by fluid flowing through the one or more interfaces.

13. The fluid enclosure interface system of claim 12, wherein the fluid flowing through the one or more interfaces comprises hydrogen.

14. The fluid enclosure interface system of claim 12, wherein the fluid flowing through the one or more interfaces comprises one or more of ammonia, formic acid, methanol, ethanol, formic acid, butane, borohydride compounds or combinations thereof.

15. A method of making a fluid enclosure interface system, comprising:
forming a strain absorbing interface;
forming a flexible fluid enclosure that includes a structural filler and an outer enclosure, the structural filler including a binder and a material capable of occluding and desorbing a fluid and the outer enclosure wall conformably coupled to the structural filler; and
contacting the strain absorbing interface with the flexible fluid enclosure and a device that can control the flow of a fluid into or out of the enclosure.

16. The method of claim 15, wherein the contacting comprises adhering.

17. The method of claim 15, wherein contacting comprises heating an adhesive.

18. The method of claim 15, wherein contacting comprises applying an adhesive.

19. The method of claim 15, wherein contacting comprises applying pressure to an adhesive.

20. The method of claim 15, wherein contacting the strain absorbing interface with a flexible fluid enclosure and a component comprises contacting the fluid enclosure on a first side of the interface and contacting the component on a second side of the interface.

21. A method of allowing for a differential in strain between a flexible enclosure and one or more fluid flow control components, comprising:
    straining an outer enclosure wall conformably coupled to a structural filler by the occlusion or desorption of a fluid within a material enclosed by the outer enclosure wall;
    relieving a strain at an interface of the outer enclosure wall and one or more fluid flow control components in contact with the outer enclosure wall.

22. The method of claim 21, wherein straining comprises contacting a flexible fluid enclosure with a fluid, sufficient to increase one or more of the dimensions of the fluid enclosure.

23. The method of claim 21, wherein relieving comprises absorbing a strain at an interface of the flexible fluid enclosure and one or more components in contact with the enclosure.

24. The method of claim 21, wherein straining is in response to a change in temperature, a change in pressure, a contacting of a fluid or a combination thereof, with regard to the flexible fluid enclosure.

\* \* \* \* \*